US009474090B2

(12) United States Patent
Mehrotra et al.

(10) Patent No.: US 9,474,090 B2
(45) Date of Patent: Oct. 18, 2016

(54) METHOD AND APPARATUS FOR IMPROVED RESOURCE ALLOCATION IN AD HOC GROUP CALLS

(71) Applicant: MOTOROLA SOLUTIONS, INC, Schaumburg, IL (US)

(72) Inventors: Vikas Mehrotra, Schaumburg, IL (US); Madhusudan K Pai, Bangalore (IN)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 275 days.

(21) Appl. No.: 14/039,278

(22) Filed: Sep. 27, 2013

(65) Prior Publication Data

US 2015/0092650 A1    Apr. 2, 2015

(51) Int. Cl.
*H04H 20/71* (2008.01)
*H04W 76/00* (2009.01)
*H04W 84/18* (2009.01)

(52) U.S. Cl.
CPC ........... *H04W 76/005* (2013.01); *H04W 84/18* (2013.01)

(58) Field of Classification Search
CPC .. H04W 76/00; H04W 76/005; H04W 84/18
USPC ................................................. 370/329–342
See application file for complete search history.

(56) References Cited

U.S. PATENT DOCUMENTS

| 8,050,700 | B2 | 11/2011 | Copeland |
| 8,406,799 | B2 | 3/2013 | Miller et al. |
| 8,441,962 | B1* | 5/2013 | Breau et al. ................... 370/259 |
| 2001/0055286 | A1* | 12/2001 | Lin et al. ........................ 370/329 |
| 2006/0172753 | A1* | 8/2006 | Sung et al. ...................... 455/518 |
| 2007/0140252 | A1* | 6/2007 | Akhtar et al. .............. 370/395.2 |
| 2007/0238477 | A1 | 10/2007 | Furrer et al. |
| 2009/0239527 | A1* | 9/2009 | Forsten et al. ............. 455/426.1 |
| 2010/0330973 | A1 | 12/2010 | Miller et al. |
| 2011/0151917 | A1* | 6/2011 | Mao et al. ...................... 455/519 |
| 2013/0029714 | A1 | 1/2013 | Koren et al. |
| 2013/0115995 | A1 | 5/2013 | Miller et al. |

OTHER PUBLICATIONS

Australian Office Action Dated Jun. 18, 2015 for Counterpart Application 2014221278.

* cited by examiner

Primary Examiner — Kan Yuen
(74) Attorney, Agent, or Firm — Daniel R. Bestor

(57) ABSTRACT

A method and apparatus for improved resource allocation in ad hoc group calls includes receiving a request for an ad hoc group call with another push-to-talk (PTT) system between a plurality of subscriber units comprising a plurality of Project 25 (P25) subscriber units; allocating resources with the another PTT system using an Inter Radio Frequency Subsystem Interface (ISSI) network to network interface (NNI); and identifying the ad hoc group call as a single logical call for the plurality of P25 subscriber units on the ISSI NNI. This can also include allocating a single channel for the plurality of P25 subscriber units identified as the single logical call.

14 Claims, 8 Drawing Sheets

METHOD AND APPARATUS FOR IMPROVED RESOURCE ALLOCATION IN AD HOC GROUP CALLS

BACKGROUND OF THE INVENTION

The present disclosure relates to wireless networking and ad hoc group calls therein. Broadband Push-to-Talk (PTT) to Project 25 (P25) interoperability is achieved using the P25 Inter Radio Frequency (RF) Subsystem Interface (ISSI) as a Network-to-Network Interface (NNI) protocol. The ISSI interface allows bridging mobile-to-mobile calls and group calls (either side can home the group) from broadband networks to P25 networks. Ad hoc group calls are a feature on broadband PTT such as the Open Mobile Alliance (OMA) Push-to-Talk Over Cellular (PoC), and Motorola's Proprietary PTT, etc. When a broadband user sets up an ad hoc group call by selecting one more contacts and/or one or more groups, the call is made to the superset of all contacts and groups. When an NNI protocol like OMA PoC is used for making an ad hoc group call, the list of all parties in the remote system can be sent in one Session Initiation Protocol (SIP) INVITE. This facility is not present in ISSI. As a result, for example, when a broadband user makes an ad hoc group call by selecting 10 P25 Subscriber Units (SUs), there are 10 ISSI call legs initiated to the P25 network, and assuming the 10 P25 SUs are at a same site, today this results in 10 channels being used up at the same site for one call.

Accordingly, there is a need for a method and apparatus for improved resource allocation in ad hoc group calls.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
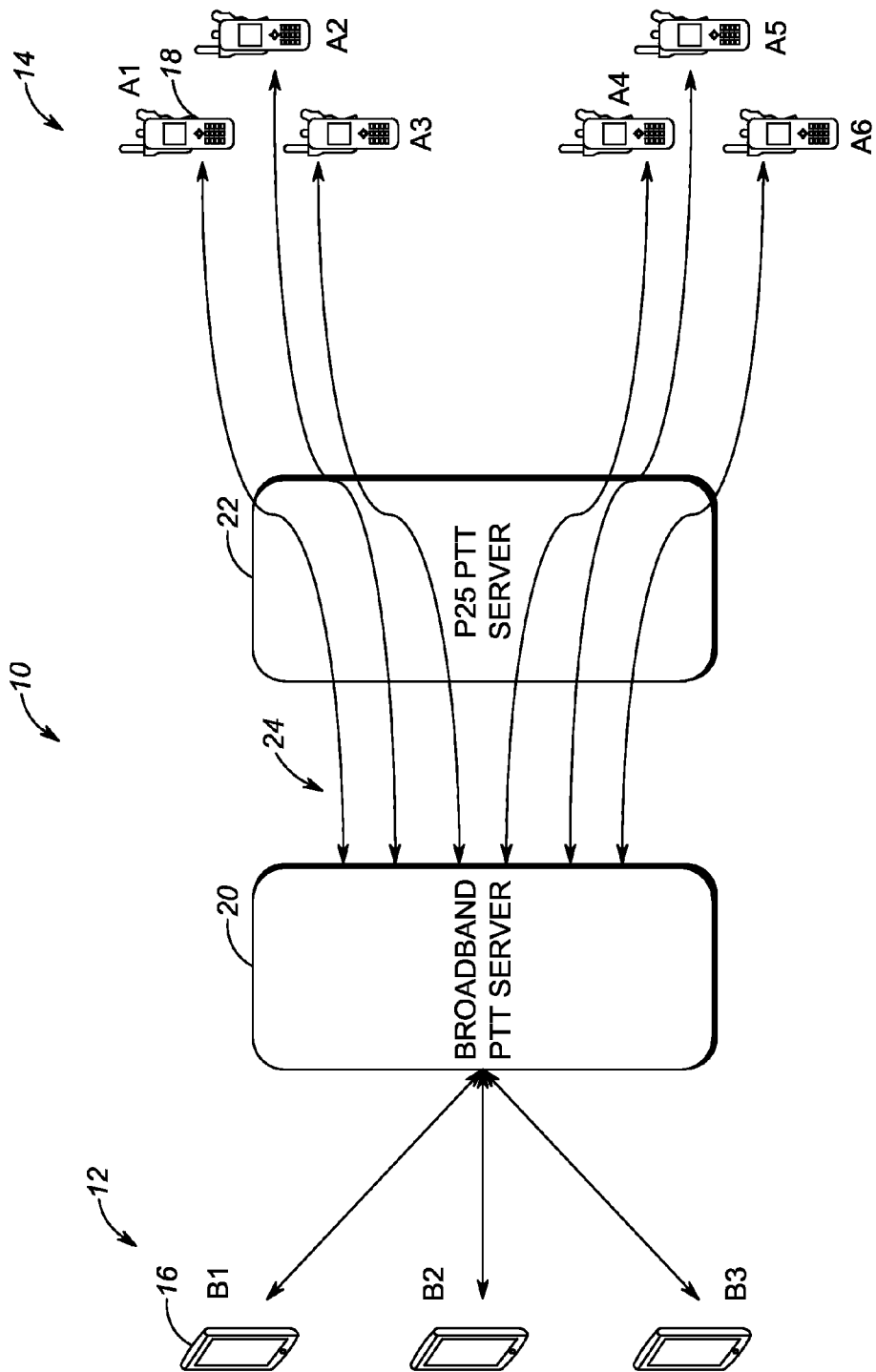
FIG. 1 is a network diagram of a network including a broadband network and a P25 network in accordance with the prior art.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

In an exemplary embodiment, a method includes receiving a request for an ad hoc group call with another push-to-talk (PTT) system between a plurality of subscriber units comprising a plurality of Project 25 (P25) subscriber units; allocating resources with the another PTT system using an Inter Radio Frequency Subsystem Interface (ISSI) network to network interface (NNI); and identifying the ad hoc group call as a single logical call for the plurality of P25 subscriber units on the ISSI NNI.

In another exemplary embodiment, a server includes a network interface and a processor, each communicatively coupled therebetween; and memory storing instructions that, when executed, cause the processor to: receive a request, through the network interface, for an ad hoc group call with another push-to-talk (PTT) system between a plurality of subscriber units comprising a plurality of Project 25 (P25) subscriber units; allocate resources with the another PTT system using an Inter Radio Frequency Subsystem Interface (ISSI) network to network interface (NNI) over the network interface; and identify the ad hoc group call as a single logical call for the plurality of P25 subscriber units on the ISSI NNI.

In yet another exemplary embodiment, a network includes a broadband push-to-talk (PTT) server communicatively coupled to at least one broadband subscriber unit; a Project 25 (P25) PTT server communicatively coupled to a plurality of P25 subscriber units; and an Inter Radio Frequency Subsystem Interface (ISSI) network to network interface (NNI) between the broadband PTT server and the P25 PTT server; wherein an ad hoc group call between the at least one broadband subscriber unit and the plurality of P25 subscriber units is signaled as a single logical call for the plurality of P25 subscriber units on the ISSI NNI.

In various exemplary embodiments, a method and apparatus for improved resource allocation in ad hoc group calls treats multiple SUs at a given site involved in a same ad hoc group call from a broadband side as a single logical call with a single channel at that site for the call over P25. Of course, practical embodiments can include P25 users at various different sites for a given ad hoc group call, and the method and apparatus allows usage of at most one and only one channel at each site (as opposed to as many channels as number of users at each site). On the broadband side, the ad hoc group call may be a result of multiple P25 SUs being called because they are part of an ad hoc group call established by a user and/or multiple P25 SUs being called because they are configured as group participants of multiple predefined groups called by the user on the broadband side (e.g., a broadband group_g1 has broadband users B1, B2, B3 and P25 users A1 and A2 as configured on the broadband system). In another exemplary embodiment, the given broadband system may be configured to communicate with multiple other broadband and/or P25 PTT systems. The originator may establish an adhoc group call to plurality of participants across multiple broadband PTT and/or P25 PTT systems.

The method and apparatus disclosed herein describes that multiple P25 SUs at a given site involved in the same ad hoc group call from a broadband side shall be assigned one channel at that site for the given call. In an exemplary embodiment, the method and apparatus includes aggregation of parties into one INVITE on an ISSI interface. This can include enhancements to the ISSI interface to support a new call type. For example, Section 3.4.1.2 of TIA ISSI specification "P25 Radical Names" can have a new name to indicate an ad hoc group call, such as "TIA-P25-Adhoc." When a call is setup with this name, the SIP INVITE to the P25 network can carry additional information, such as a list of Subscriber Unit Identifiers (SUIDs) and/or Subscriber Group Identifiers (SGIDs) that are being called from the broadband side. In another exemplary embodiment, the method and apparatus includes an additional identifier in an INVITE to associate different ISSI INVITEs with one call session. This can include an additional parameter in SIP headers or Session Description Protocol (SDP) that may be used to associate multiple call legs over ISSI with same call context.

FIG. 1 is a network diagram of a network 10 including a broadband network 12 and a P25 network 14 in accordance with the prior art. The broadband network 12 can be a 3G, 4G, Long Term Evolution (LTE), WiMAX, Wi-Fi, etc. based network, and the broadband network 12 includes various broadband SUs 16. In this example, the broadband network 12 includes three SUs 16, labeled B1, B2, B3. The broadband SUs 16 can include smart phones, cell phones, tablets, net books, ultra books, laptops, mobile devices, access terminals, etc. The P25 network includes various SUs 18, labeled A1, A2, A3, A4, A5, A6. The SUs 18 can be mobile radios or the like. In the context of FIG. 1, the SUs 16, 18 are participating in an ad hoc group call, e.g., B1 makes an ad hoc group call to multiple contacts: {B2, B3, A1, A2, . . . , A6}. The SUs 16 are communicatively coupled to a broadband PTT server 20, and the SUs 18 are communicatively coupled to a P25 PTT server 22. From an interoperability perspective between the broadband network 12 and the P25 network 14, the servers 20, 22 have an NNI interface of ISSI therebetween. FIG. 1 is an example of conventional operation where, for the ad hoc group call, there are six ISSI call legs 24 without any relationship to one another over the NNI interface.

Figure 2:
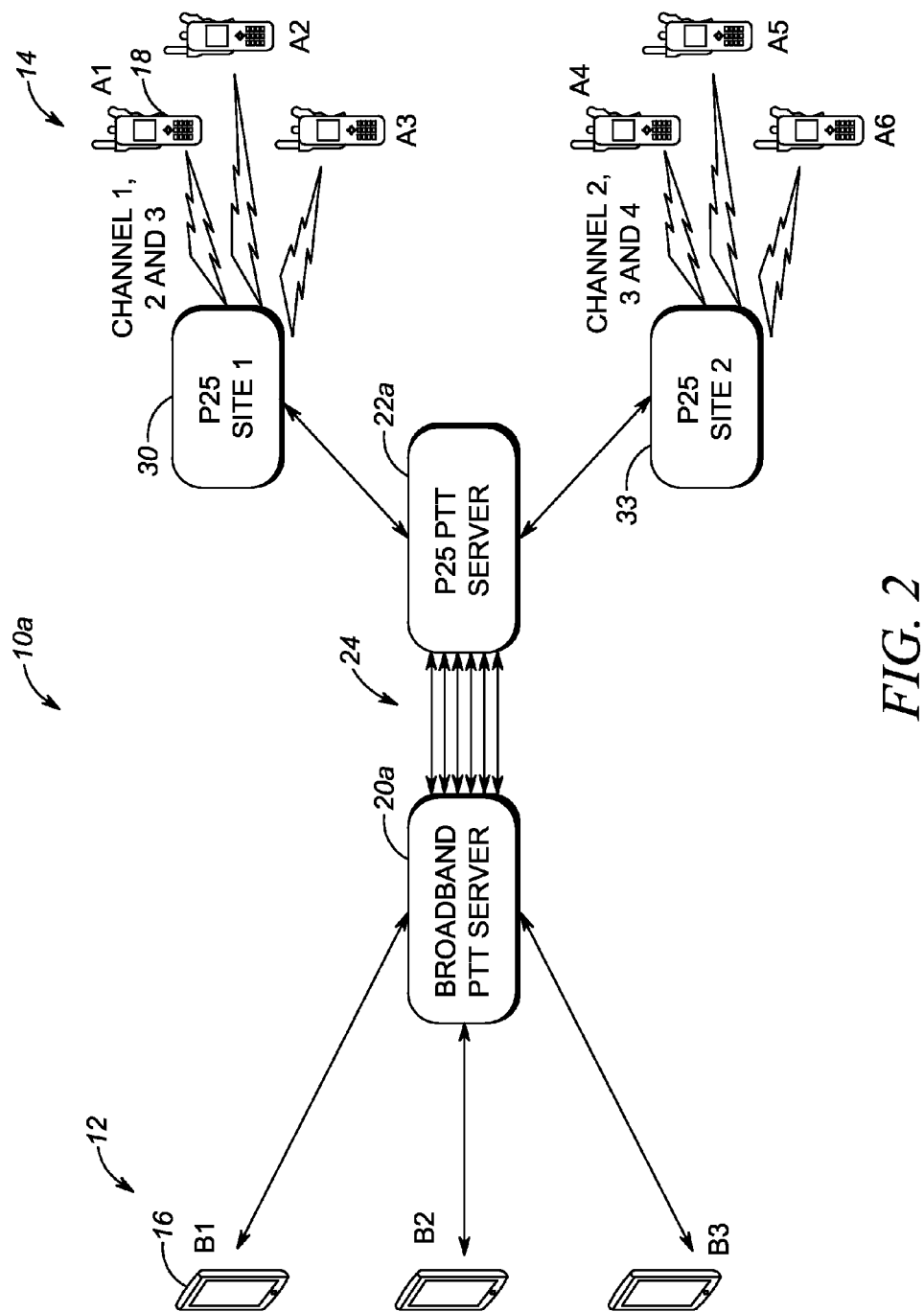
FIG. 2 is a network diagram of another exemplary embodiment of a network including a broadband network and a P25 network in accordance with the prior art.

FIG. 2 is a network diagram of another exemplary embodiment of a network 10a including a broadband network 12 and a P25 network 14 in accordance with the prior art. The network 10a has a similar configuration as the network 10 with a broadband PTT server 20a communicatively coupled to the SUs 16 and a P25 PTT Server 22a communicatively coupled to two P25 sites 30, 32. For example, the SUs 18 A1, A2, and A3 can be located at a first P25 site 30 and the SUs 18 A4, A5, and A6 can be located at a second P25 site 32. Similar to the network 10, there are six SU-SU call legs 24 without any relationship therebetween over the ISSI interface between the servers 20a and 22a. Again, in the context of FIG. 2, the SUs 16, 18 are participating in an ad hoc group call, e.g., B1 makes an ad hoc group call to multiple contacts: {B2, B3, A1, A2, . . . , A6}. Disadvantageously with the conventional operation of FIG. 2, there are six channels used in total at the sites 30, 32 (three at each).

Figure 3:
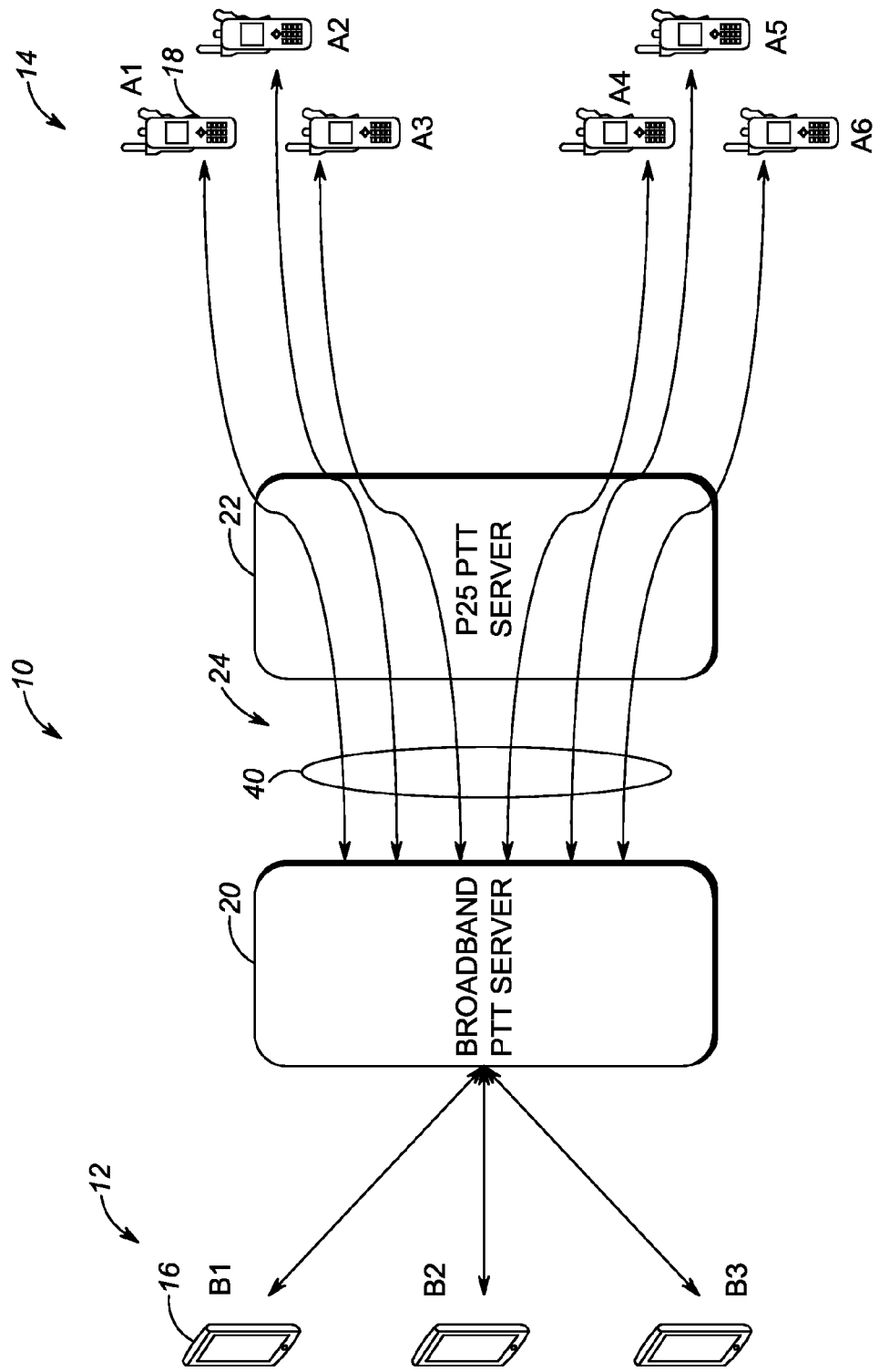
FIG. 3 is a network diagram of the network of FIG. 1 with improved P25 resource allocation in accordance with some embodiments.

FIG. 3 is a network diagram of the network 10 including the broadband network 12 and the P25 network 14 with improved P25 resource allocation in accordance with some embodiments. Here, the ISSI call legs 24 have an established relationship over the NNI interface. For example, the ISSI call legs 24 include a common identifier 40 in their SIP INVITE messages. The common identifier 40 is an additional identifier in the SIP INVITE to associate different ISSI INVITEs with one call session. The common identifier 40 can be an additional parameter in SIP headers or SDP may be used to associate multiple call legs 24 over ISSI with same call context. Additionally, the common identifier 40 can be carried in the various media plane protocols such as but not limited to Real Time Protocol (RTP) and/or Real Time Control Protocol (RTCP) header/payload.

For example, the SIP INVITE of a SU-SU call or a Group call over the ISSI interface can carry additional standards compliant tag value pairs in the X-TIA-P25-ISSI Body to indicate the set of associated SUs 18 (P25 Group IDs and/or P25 Unit IDs) for the given call. Alternatively, the common identifier 40 can also include using existing content such as Synchronization Source (SSRC) and making it identical across all ISSI INVITES. Advantageously, this exemplary embodiment does not necessarily need standards acceptance, as it could be used and a system that does not understand such additional parameters will ignore the unrecognized parameters and the call shall be established disadvantageously as in the prior art, utilizing one channel per SU on the P25 side.

Figure 4:
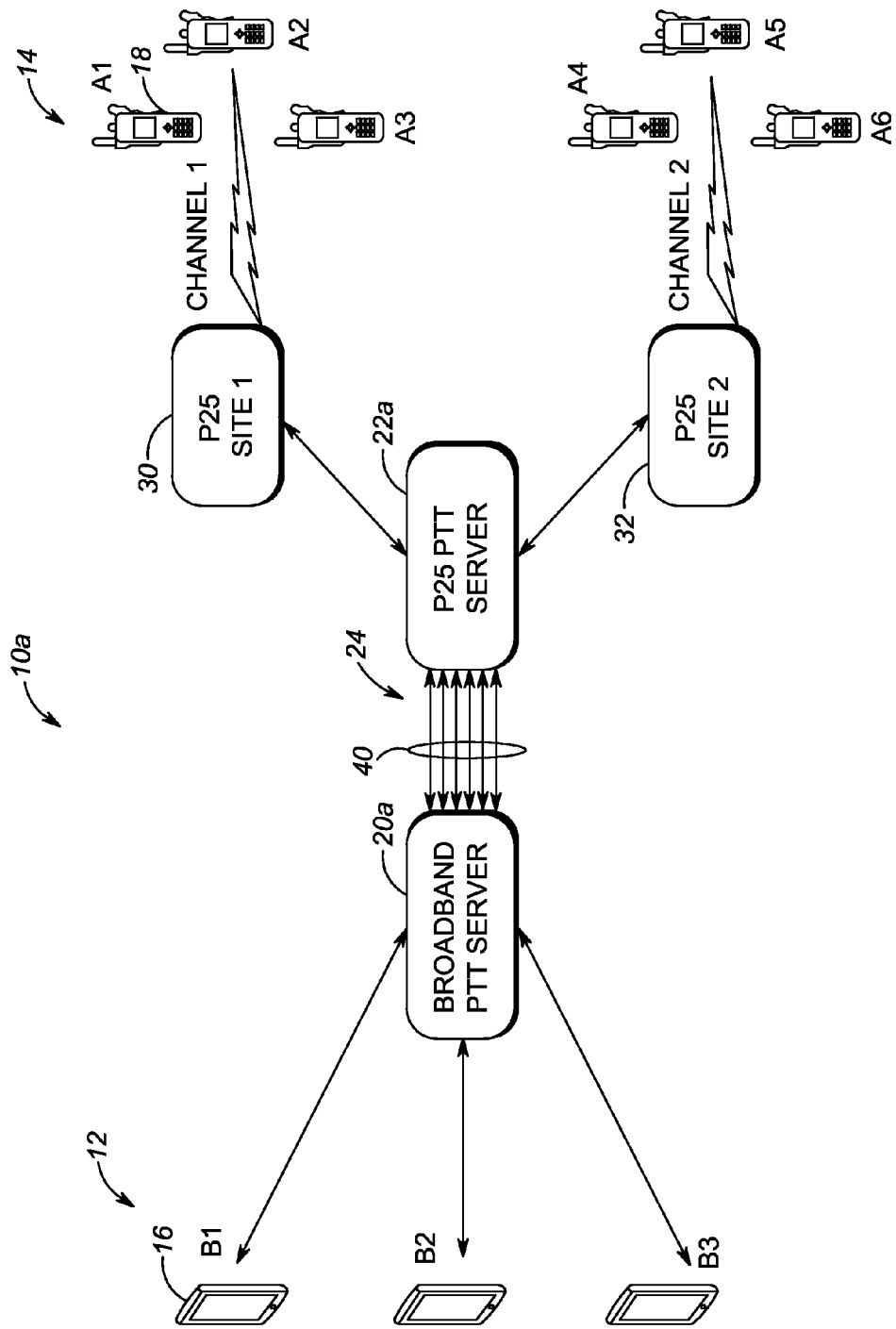
FIG. 4 is a network diagram of the network of FIG. 2 with improved P25 resource allocation utilizing a common identifier in accordance with some embodiments.

FIG. 4 is a network diagram of the network 10a with improved P25 resource allocation utilizing a common identifier in accordance with some embodiments. Specifically, FIG. 4 illustrates the same network 10a as FIG. 2 utilizing the common identifier 40 on the call legs 24 from FIG. 3. Based on the common identifier 40, the P25 PTT Server 22a is configured to assign a single channel for each site for the ad hoc group call as opposed to one channel for each SU 18 as shown in FIG. 2. For example, the SUs 18 A1, A2, and A3 share a single channel at the P25 site 30, and the SUs 18 A4, A5, and A6 share a single channel at the P25 site 32. FIGS. 3 and 4 are exemplary embodiments of the method and apparatus where an additional parameter in SIP headers or SDP may be used to associate multiple call legs 24 over ISSI with same call context for common identification thereof. That is, the exemplary embodiments of FIGS. 3 and 4 include one ISSI call leg 24 for each SU 18, but the P25 PTT Server 22a interprets the signaling messages to only allocate one channel per site for participants of the same ad hoc group call.

Figure 5:
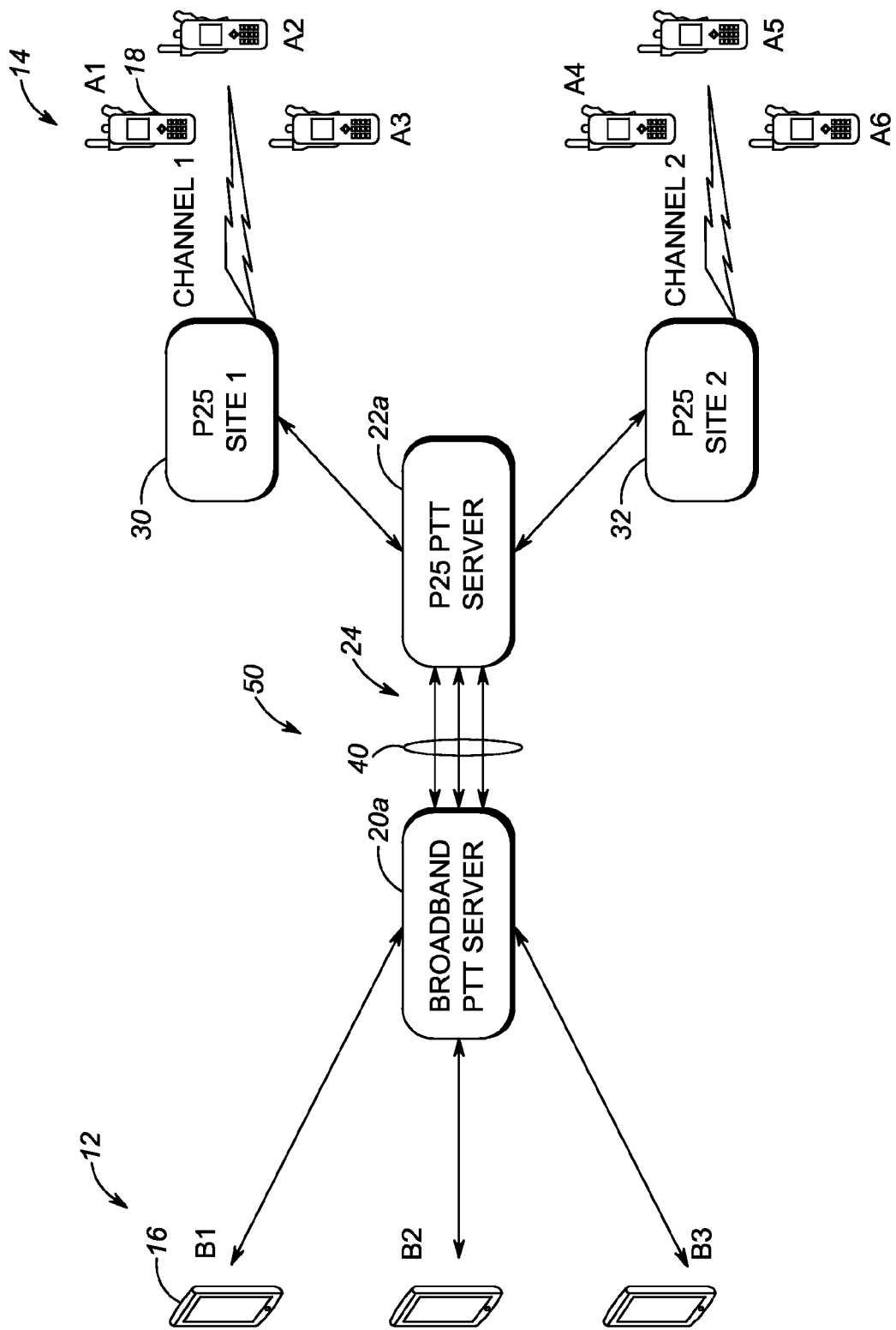
FIG. 5 is a network diagram of the network of FIG. 2 with improved P25 resource allocation utilizing aggregation of ISSI call legs in accordance with some embodiments.

FIG. 5 is a network diagram of the network of FIG. 2 with improved P25 resource allocation utilizing aggregation of ISSI call legs in accordance with some embodiments. FIG. 5 illustrates the same network 10a as FIGS. 2 and 4, but provides aggregation 50 on the call legs 24. For example, the aggregation 50 can include an enhancement to the ISSI interface to support a new call type: Section 3.4.1.2 of TIA ISSI specification "P25 Radical Names" can have a new name to indicate an ad hoc group call, such as "TIA-P25-Adhoc." When a call is setup with this name, the SIP INVITE to the P25 network 14 shall carry additional information of list of SUIDs and/or SGIDs that are being called from the broadband network 12.

For example in FIG. 5, assume the SU 18 B1 makes an ad hoc group call to multiple contacts: {B2, B3, A1, A2 and an ASTRO group ASTRO_TG_A (configured on A3, A4, A5, and A6)}. When the broadband SU 16 B1 makes an ad hoc group call to multiple contacts: {B2, B3, A1, A2 and ASTRO_TG_A (members A3, A4, A5, A6)}, there will be 3 ISSI INVITEs sent out by the broadband server: (1) ISSI call to the SU 18 A1, (2) ISSI call to the SU 18 A2, and (3) ISSI call to the group ASTRO_TG_A. Note, ASTRO_TG_A is a defined ad hoc group call configured on SUs 18 A3, A4, A5, A6, and the SUs 18 A1, A2 are not part of this defined ad hoc group call for illustration purposes. Here, the network 10*a* includes three ISSI call legs 24, one for the SU 18 A1, one for the SU 18 A2, and one for the defined ad hoc group call ASTRO_TG_A.

Further, the three ISSI call legs 24 can also include the common identifier 40 as described herein. Thus, the common identifier 40 and the aggregation 50 via the defined ad hoc group call can operate together. In FIG. 5, assuming all of the SUs 18 were part of the defined ad hoc group call, there would be a single ISSI call leg 24 between the servers 20*a*, 22*a* and the common identifier 40 would not be needed. This aggregation 50 can be used to identify that a call being setup to any number of defined ad hoc talk groups, e.g., {g1, g2, . . . gn}, or SUs 18, e.g., {A1, A2, . . . Am}, belong to the same call context on the peer ISSI network. For example, in FIG. 5, all the above INVITEs shall have an additional parameter in the SIP headers or SDP to indicate they are all spawned due to the same broadband call (e.g., "callid=1234567" may be present in all the SIP INVITEs or the Synchronization Source (SSRC) may be the same in SDP of each SIP INVITE). Thus, the P25 PTT Server 22*a* can use this information to allocate one and only one channel at a given site for each participant or Talk Group which is associated with the given broadband call at that site.

In another exemplary embodiment, the method and apparatus can perform the aggregation 50 without utilizing the defined ad hoc group call ASTRO_TG_A. Instead, a callee list can be included in an ISSI INVITE body. In this case, the aggregation 50 can include a callee list of the SUs 18 A1, A2, A3, A4, A5, and A6 in the ISSI INVITE body thereby requiring only a single ISSI call leg 24.

Figure 6:
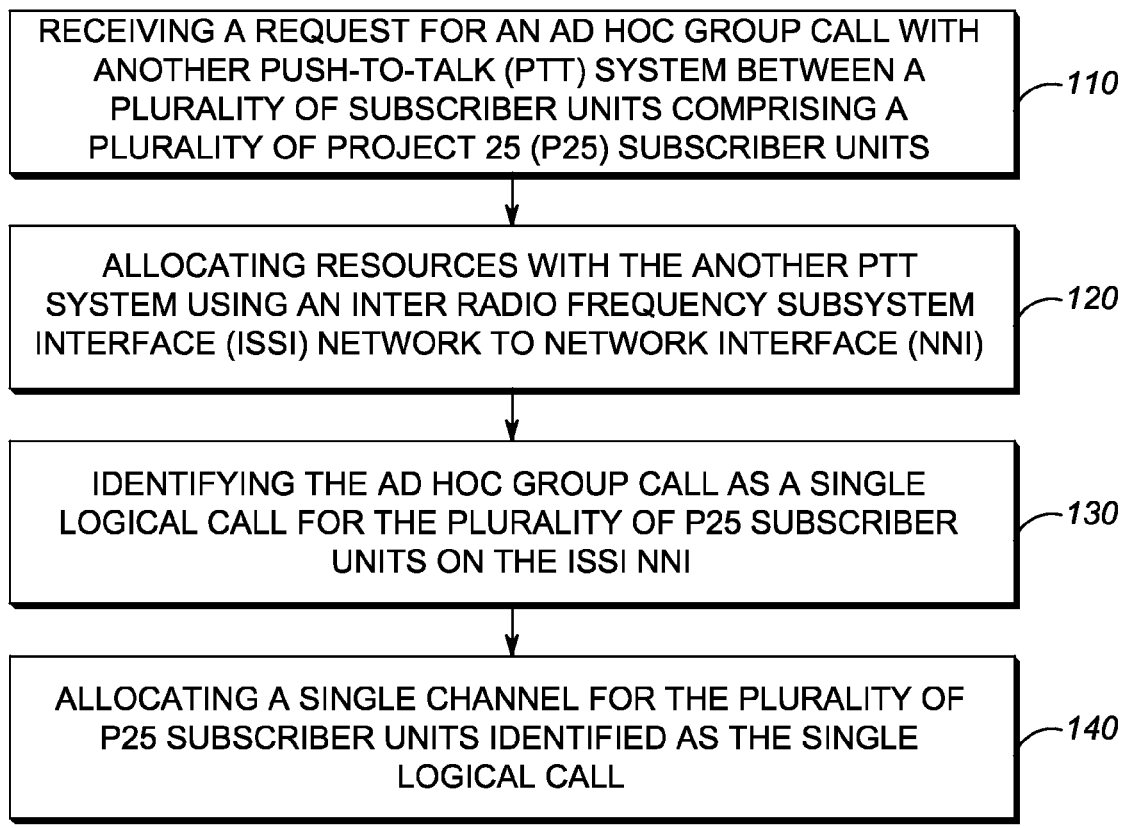
FIG. 6 is a flowchart of an improved P25 resource allocation method in accordance with some embodiments.

FIG. 6 is a flowchart of an improved P25 resource allocation method 100 in accordance with some embodiments. The improved P25 resource allocation method 100 can be implemented in the networks 10, 10*a* and the like. The improved P25 resource allocation method 100 includes receiving a request for an ad hoc group call with another push-to-talk (PTT) system between a plurality of subscriber units comprising a plurality of Project 25 (P25) subscriber units (step 110). For example, the improved P25 resource allocation method 100 can be utilized between a broadband PTT system and a P25 PTT system. An objective of the improved P25 resource allocation method 100 is to treat multiple calls over an ISSI NNI as a single logical call thereby improving resource allocation in the P25 PTT system.

The improved P25 resource allocation method 100 includes allocating resources with the another PTT system using an Inter Radio Frequency Subsystem Interface (ISSI) network to network interface (NNI) (step 120). In an exemplary embodiment, the improved P25 resource allocation method 100 can include allocating the resources with the another PTT system using the ISSI NNI with a common identifier for the plurality of P25 subscriber units indicating a relationship in call setup messaging. Optionally, the common identifier includes an additional parameter in a Session Initiation Protocol (SIP) header or Session Description Protocol (SDP) to associate the plurality of P25 subscriber units in the single logical call. Alternatively, the common identifier is provided via a Real Time Protocol (RTP) header/payload or a Real Time Control Protocol (RTCP) header/payload. Additionally, the common identifier can include an identical Synchronization Source (SSRC) across the ISSI NNI for the plurality of P25 subscriber units.

In another exemplary embodiment, the improved P25 resource allocation method 100 can include allocating the resources with the another PTT system using the ISSI NNI with the plurality of P25 subscriber units aggregated into combined ISSI call setup requests. Optionally, the plurality of P25 subscriber units are aggregated into a defined ad hoc group call. Alternatively, the plurality of P25 subscriber units are aggregated through tag value pairs in a Session Initiation Protocol (SIP) INVITE indicating the plurality of P25 subscriber units. The improved P25 resource allocation method 100 can also include allocating the resources with the another PTT system using the ISSI NNI with a common identifier for the plurality of P25 subscriber units indicating a relationship in call setup messaging in addition to aggregating into the combined ISSI call setup requests.

The improved P25 resource allocation method 100 includes identifying the ad hoc group call as a single logical call for the plurality of P25 subscriber units on the ISSI NNI (step 130). As described above, based on the allocating resources step 130, the plurality of P25 subscriber units can be identified in a single logical call for improved resource allocation. This can be through aggregation of ISSI NNI call legs, call tagging through a common identifier on multiple ISSI NNI call legs, or a combination thereof. The improved P25 resource allocation method 100 can include allocating a single channel for the plurality of P25 subscriber units identified as the single logical call (step 140). Here, on a P25 network, instead of one channel per P25 subscriber at a site, an ad hoc group call can have only one channel per site for all of the P25 subscribers. That is, if the plurality of P25 subscriber units are located at a plurality of sites, and the improved P25 resource allocation method 100 can include allocating a single channel for each of the plurality of sites for the plurality of P25 subscriber units identified as the single logical call.

Variously, the improved P25 resource allocation method 100 includes a method of establishing an ad hoc group call between two PTT systems using the ISSI NNI indicating aggregation of multiple called parties into one ISSI call setup request. This can be a new ad hoc group call type, addition of a callee list in an ISSI INVITE body, etc. The improved P25 resource allocation method 100 includes a method of establishing an ad hoc group call between two PTT systems using the ISSI NNI indicating co-relation of multiple sessions by passing an identifier in the call setup messaging. This can be a new tag value pair with identical content in multiple INVITEs or using existing content such as SSRC and making it identical across INVITEs.

The improved P25 resource allocation method 100 can include a method of PTT service at the serving RF subsystem (RFSS) which interprets the above indication received from the peer ISSI network and performs intelligent resource utilization. Specifically, the P25 PTT server 22, etc. can interpret the indication, aggregation, etc. on the ISSI NNI to assign one and only one channel (trunking system) or frequency (conventional system) at a P25 site for multiple units and/or groups (with participants) at a given site. The improved P25 resource allocation method 100 can also be implemented by the servers 20, 20*a*, 22, 22*a*.

Figure 7:
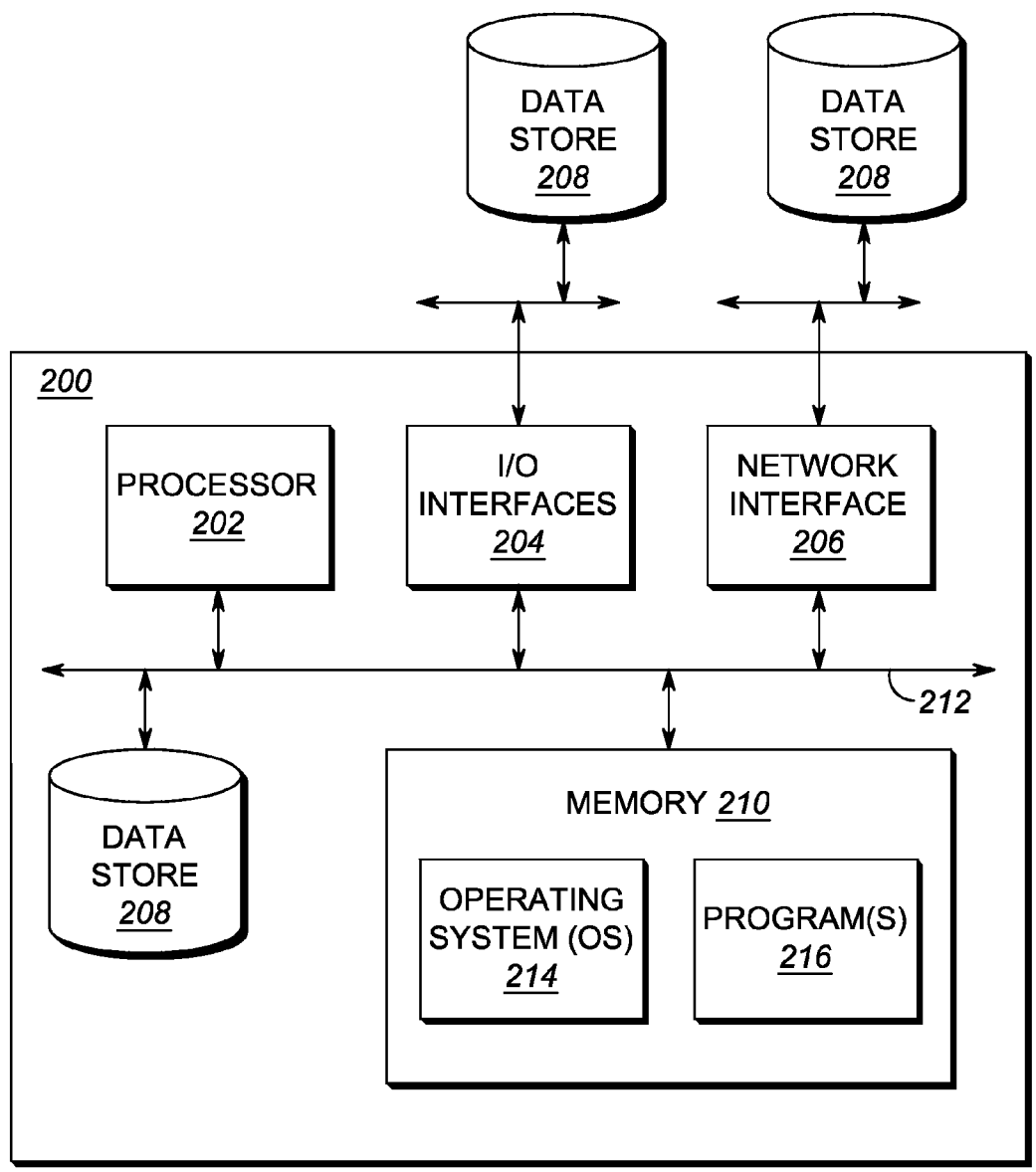
FIG. 7 is a block diagram of a server which may be used with the networks of FIGS. 3-5 and the improved P25 resource allocation method of FIG. 6 in accordance with some embodiments.

FIG. 7 is a block diagram of a server 200 which may be used with the networks 10, 10*a*, the improved P25 resource allocation method 100, and the like in accordance with some embodiments. For example, the server 200 can be an exemplary implementation of the servers 20, 20a, 22, 22a described herein. The server 200 may be a digital computer that, in terms of hardware architecture, generally includes a processor 202, input/output (I/O) interfaces 204, a network interface 206, a data store 208, and memory 210. It should be appreciated by those of ordinary skill in the art that FIG. 7 depicts the server 200 in an oversimplified manner, and a practical embodiment may include additional components and suitably configured processing logic to support known or conventional operating features that are not described in detail herein. The components (202, 204, 206, 208, and 210) are communicatively coupled via a local interface 212. The local interface 212 may be, for example but not limited to, one or more buses or other wired or wireless connections, as is known in the art. The local interface 212 may have additional elements, which are omitted for simplicity, such as controllers, buffers (caches), drivers, repeaters, and receivers, among many others, to enable communications. Further, the local interface 212 may include address, control, and/or data connections to enable appropriate communications among the aforementioned components.

The processor 202 is a hardware device for executing software instructions. The processor 202 may be any custom made or commercially available processor, a central processing unit (CPU), an auxiliary processor among several processors associated with the server 200, a semiconductor-based microprocessor (in the form of a microchip or chip set), or generally any device for executing software instructions. When the server 200 is in operation, the processor 202 is configured to execute software stored within the memory 210, to communicate data to and from the memory 210, and to generally control operations of the server 200 pursuant to the software instructions. The I/O interfaces 204 may be used to receive user input from and/or for providing system output to one or more devices or components. User input may be provided via, for example, a keyboard, touch pad, and/or a mouse. System output may be provided via a display device and a printer (not shown). I/O interfaces 204 may include, for example, a serial port, a parallel port, a small computer system interface (SCSI), a serial ATA (SATA), a fibre channel, Infiniband, iSCSI, a PCI Express interface (PCI-x), an infrared (IR) interface, a radio frequency (RF) interface, and/or a universal serial bus (USB) interface.

The network interface 206 may be used to enable the server 200 to communicate on a network, such as the Internet, a wide area network (WAN), a local area network (LAN), and the like, etc. The network interface 206 can include multiple devices to enable multiple connections to the network. In the various exemplary embodiments described herein, the network interface 206 can form the ISSI NNI with another server 200 as well as connect the server 200 to any of the SUs 16, 18. The network interface 206 may include, for example, an Ethernet card or adapter (e.g., 10 BaseT, Fast Ethernet, Gigabit Ethernet, 10 GbE, etc.) or a wireless local area network (WLAN) card or adapter (e.g., 802.11a/b/g/n). The network interface 206 may include address, control, and/or data connections to enable appropriate communications on the network. A data store 208 may be used to store data. The data store 208 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 208 may incorporate electronic, magnetic, optical, and/or other types of storage media. In one example, the data store 1208 may be located internal to the server 200 such as, for example, an internal hard drive connected to the local interface 212 in the server 200. Additionally in another embodiment, the data store 208 may be located external to the server 200 such as, for example, an external hard drive connected to the I/O interfaces 204 (e.g., SCSI or USB connection). In a further embodiment, the data store 208 may be connected to the server 200 through a network, such as, for example, a network attached file server.

The memory 210 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 210 may incorporate electronic, magnetic, optical, and/or other types of storage media. Note that the memory 210 may have a distributed architecture, where various components are situated remotely from one another, but can be accessed by the processor 202. The software in memory 210 may include one or more software programs, each of which includes an ordered listing of executable instructions for implementing logical functions. The software in the memory 210 includes a suitable operating system (O/S) 214 and one or more programs 216. The operating system 214 essentially controls the execution of other computer programs, such as the one or more programs 216, and provides scheduling, input-output control, file and data management, memory management, and communication control and related services. The one or more programs 216 may be configured to implement the various processes, algorithms, methods, techniques, etc. described herein related to the improved P25 resource allocation method and apparatus.

Figure 8:
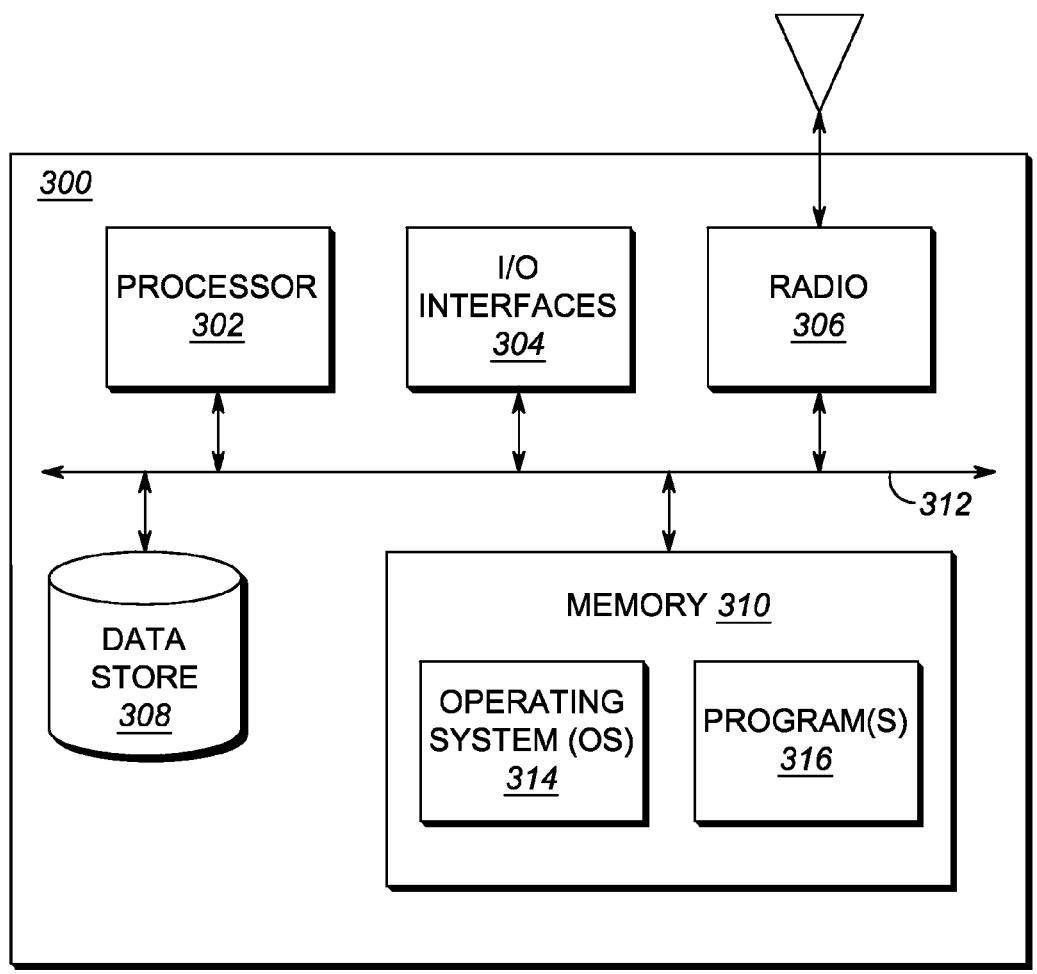
FIG. 8 is a block diagram of a subscriber unit which may be used with the networks of FIGS. 3-5 and the improved P25 resource allocation method of FIG. 6 in accordance with some embodiments.

FIG. 8 is a block diagram of a subscriber unit 300 which may be used with the networks 10, 10a, the improved P25 resource allocation method 100, and the like in accordance with some embodiments. For example, the subscriber unit 300 can be an exemplary implementation of the SUs 16, 18. The subscriber unit 300 can be a digital device that, in terms of hardware architecture, generally includes a processor 302, input/output (I/O) interfaces 304, a radio 306, a data store 308, and memory 310. It should be appreciated by those of ordinary skill in the art that FIG. 8 depicts the subscriber unit 300 in an oversimplified manner, and a practical embodiment may include additional components and suitably configured processing logic to support known or conventional operating features that are not described in detail herein. The components (302, 304, 306, 308, and 310) are communicatively coupled via a local interface 312. The local interface 312 can be, for example but not limited to, one or more buses or other wired or wireless connections, as is known in the art. The local interface 312 can have additional elements, which are omitted for simplicity, such as controllers, buffers (caches), drivers, repeaters, and receivers, among many others, to enable communications. Further, the local interface 312 may include address, control, and/or data connections to enable appropriate communications among the aforementioned components.

The processor 302 is a hardware device for executing software instructions. The processor 302 can be any custom made or commercially available processor, a central processing unit (CPU), an auxiliary processor among several processors associated with the subscriber unit 300, a semiconductor-based microprocessor (in the form of a microchip or chip set), or generally any device for executing software instructions. When the subscriber unit 300 is in operation, the processor 302 is configured to execute software stored within the memory 310, to communicate data to and from the memory 310, and to generally control operations of the subscriber unit 300 pursuant to the software instructions. In an exemplary embodiment, the processor 302 may include a mobile optimized processor such as optimized for power consumption and mobile applications. The I/O interfaces 304 can be used to receive user input from and/or for providing system output. User input can be provided via, for example, a keypad, a touch screen, a scroll ball, a scroll bar, buttons, bar code scanner, and the like. System output can be provided via a display device such as a liquid crystal display (LCD), touch screen, and the like. The I/O interfaces 304 can also include, for example, a serial port, a parallel port, a small computer system interface (SCSI), an infrared (IR) interface, a radio frequency (RF) interface, a universal serial bus (USB) interface, and the like. The I/O interfaces 304 can include a graphical user interface (GUI) that enables a user to interact with the subscriber unit 300.

The radio 306 enables wireless communication to an external access device or network. Any number of suitable wireless data communication protocols, techniques, or methodologies can be supported by the radio 306, including, without limitation: RF; P25; IrDA (infrared); Bluetooth; ZigBee (and other variants of the IEEE 802.15 protocol); IEEE 802.11 (any variation); IEEE 802.16 (WiMAX or any other variation); Direct Sequence Spread Spectrum; Frequency Hopping Spread Spectrum; Long Term Evolution (LTE); cellular/wireless/cordless telecommunication protocols (e.g. 3G/4G, etc.); wireless home network communication protocols; paging network protocols; magnetic induction; satellite data communication protocols; wireless hospital or health care facility network protocols such as those operating in the WMTS bands; GPRS; proprietary wireless data communication protocols such as variants of Wireless USB; and any other protocols for wireless communication. For example, the SUs 16 can include a broadband radio for communication on the broadband network 12, and the SUs 18 can include a P25 radio for communication on the P25 network 14. In an exemplary embodiment, the SUs 16 can be multi-mode devices with different chipsets for P25 and 3GPP LTE network support. The data store 308 may be used to store data. The data store 308 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 308 may incorporate electronic, magnetic, optical, and/or other types of storage media.

The memory 310 may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 310 may incorporate electronic, magnetic, optical, and/or other types of storage media. Note that the memory 310 may have a distributed architecture, where various components are situated remotely from one another, but can be accessed by the processor 302. The software in memory 310 can include one or more software programs, each of which includes an ordered listing of executable instructions for implementing logical functions. In the example of FIG. 8, the software in the memory 310 includes a suitable operating system (O/S) 314 and programs 316. The operating system 314 essentially controls the execution of other computer programs, and provides scheduling, input-output control, file and data management, memory management, and communication control and related services. The programs 316 may include various applications, add-ons, etc. configured to provide end user functionality with the subscriber unit 300. For example, exemplary programs 316 may include, but not limited to, a web browser, social networking applications, streaming media applications, games, mapping and location applications, electronic mail applications, financial applications, and the like. For example, the programs 316 can include a program enabling the subscriber unit 300 to make or participate in an ad hoc group call.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for improved resource allocation at a Project 25 (P25) push-to-talk (PTT) server in a P25 system for calls arriving via an Inter Radio Frequency Subsystem Interface (ISSI), comprising:
receiving, at the P25 PTT server via an ISSI network to network interface (NNI) of the P25 PTT server, an ad hoc group call from another PTT system directed to a plurality of P25 subscriber units, the call arriving at the ISSI NNI as a plurality of call legs;
determining, across the plurality of call legs, that the ad hoc group call received via the plurality of call legs is a single logical call for the plurality of P25 subscriber units; and
allocating a single channel at each of one or more P25 sites for the plurality of P25 subscriber units for receiving the single logical call, such that a number of channels allocated across the one or more P25 sites is less than a number of the call legs received at the ISSI NNI.

2. The method of claim 1, further comprising:
allocating the single channel at a single P25 site for the plurality of P25 subscriber units identified as the single logical call.

3. The method of claim 1, wherein the plurality of P25 subscriber units are located at a plurality of P25 sites, and further comprising:
allocating the single channel at each of the plurality of P25 sites for the plurality of P25 subscriber units identified as the single logical call.

4. The method of claim 1, wherein determining that the ad hoc group call is a single logical call comprises identifying a common identifier across each of the plurality of call legs for the plurality of P25 subscriber units indicating a relationship in call setup messaging.

5. The method of claim 4, wherein the common identifier comprises an additional parameter in a Session Initiation Protocol (SIP) header or Session Description Protocol (SDP) to associate the plurality of P25 subscriber units in the single logical call.

6. The method of claim 4, wherein the common identifier is provided via a Real Time Protocol (RTP) header/payload or a Real Time Control Protocol (RTCP) header/payload.

7. The method of claim 4, wherein the common identifier comprises an identical Synchronization Source (SSRC) across the ISSI NNI for the plurality of P25 subscriber units.

8. The method of claim 1, wherein the another PTT system is a broadband PTT system.

9. A Project 25 (P25) push-to-talk (PTT) server for improved resource allocation in a P25 system for calls arriving via an Inter Radio Frequency Subsystem Interface (ISSI), the P25 PTT server comprising:
an ISSI network to network interface (NNI) and a processor, each communicatively coupled therebetween; and
memory storing instructions that, when executed by the processor, cause the processor to:
receive, via the ISSI NNI, an ad hoc group call from another PTT system directed to a plurality of P25 subscriber units, the call arriving as a plurality of call legs;
determine, across the plurality of call legs, that the ad hoc group call received via the plurality of call legs is a single logical call for the plurality of P25 subscriber units; and
allocate a single channel at each of one or more P25 sites for the plurality of P25 subscriber units for receiving the single logical call, such that a number of channels allocated across the one or more P25 sites is less than a number of the call legs received at the ISSI NNI.

10. The P25 PTT server of claim 9, wherein the instructions, when executed, further cause the processor to:
allocate the single channel at a single P25 site for the plurality of P25 subscriber units identified as the single logical call.

11. The P25 PTT server of claim 9, wherein the instructions, when executed, further cause the processor to determining that the ad hoc group call is a single logical call by:
identifying a common identifier across each of the plurality of call legs for the plurality of P25 subscriber units indicating a relationship in call setup messaging.

12. The P25 PTT server of claim 11, wherein the common identifier comprises one of:
an additional parameter in a Session Initiation Protocol (SIP) header or Session Description Protocol (SDP) to associate the plurality of P25 subscriber units in the single logical call;
data provided via a Real Time Protocol (RTP) header/payload or a Real Time Control Protocol (RTCP) header/payload; and
an identical Synchronization Source (SSRC) across the ISSI NNI for the plurality of P25 subscriber units.

13. The server of claim 9, wherein the another PTT system is a broadband PTT system.

14. The server of claim 9, wherein the plurality of P25 subscriber units are located at a plurality of P25 sites, and wherein the instructions, when executed, further cause the processor to:
 allocate the single channel at each of the plurality of P25 sites for the plurality of P25 subscriber units identified as the single logical call.

* * * * *